D. BACKUS.
Saw-Sharpening and Gumming-Machines.
No. 129,307. Patented July 16, 1872.
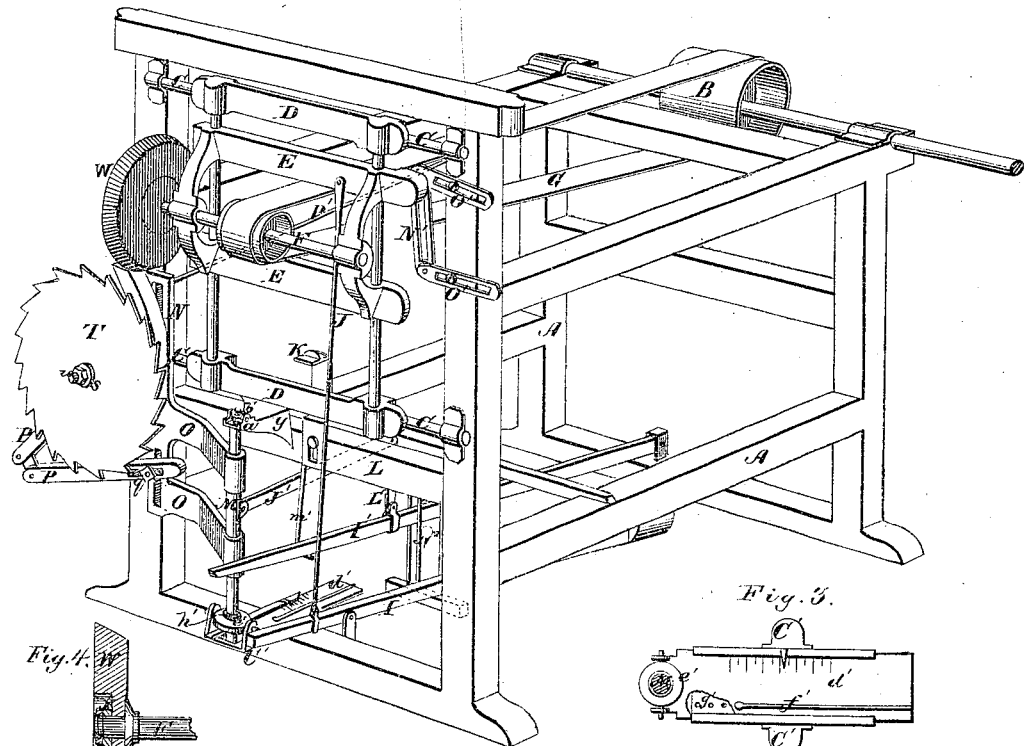
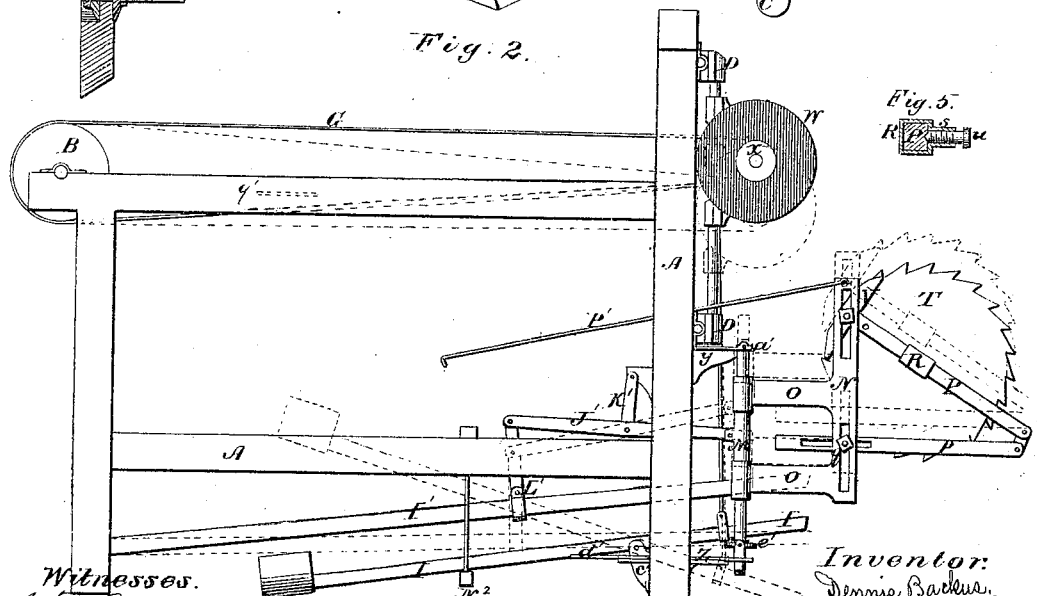

UNITED STATES PATENT OFFICE.

DENNIS BACKUS, OF OMRO, WISCONSIN.

IMPROVEMENT IN SAW-SHARPENING-AND-GUMMING MACHINES.

Specification forming part of Letters Patent No. 129,307, dated July 16, 1872.

*To all whom it may concern:*

Be it known that I, D. BACKUS, of Omro, in the county of Winnebago and State of Wisconsin, have invented a new and Improved Saw-Sharpening-and-Gumming Machine; and I do hereby declare the following to be a full, clear, and exact description of the same, reference being had to the accompanying drawing forming part of this specification, in which—

Figure 1 is a perspective view of the machine; Fig. 2, a side elevation of the same; Fig. 3, a detached plan view of the devices by which the arbor of the saw-carrying frame is adjusted. Fig. 4 is a section of the emery-wheel, showing the means by which it is secured to its arbor, and Fig. 5 is a section of the clasp by which the saw is secured to and adjusted upon the saw-stand.

Similar letters of reference in the accompanying drawing indicate the same parts.

My invention has for its object to provide an improved machine for sharpening and gumming all kinds of mill and circular saws with emery wheels instead of files. The invention consists, first, in mounting the emery wheel—which is affixed to a horizontal shaft—upon the frame of the machine in such a manner that it can be moved against the teeth of the saw in a straight line, either horizontally or vertically, or at any angle between a horizontal and vertical line. This capability adapts the wheel for adjustment nearer to or further from the center of the saw to vary the angle of the top of the teeth; also to operate against the teeth with a drawing or raking action, thereby producing smooth instead of rough edges; and further, to recede from two adjoining teeth at the same instant without abrading or injuring the edge of either. The invention consists, secondly, in constructing the wide face of the emery wheel with a large recess, to receive the loose flange by which the wheel is secured to its arbor. By this method of attachment, the wheel operates with its beveled edge against the front, and its wide face against the top of the teeth, making the former concave and the latter straight. The flange being within the recess, cannot come in contact with the top of the teeth when the wheel decreases in diameter by wear. In saw-sharpening machines as heretofore constructed the emery wheels are so applied to their arbors as to grind the front of the saw-teeth with their faces instead of beveled edges, in order to prevent the loose flange of the arbor from coming in contact with and injuring the teeth. The result of this arrangement is that the teeth are sharpened or ground with a concave top and straight face, the exact reverse of what is required to operate the saw to the best advantage. The invention consists, thirdly, in mounting the adjustable saw-carrying stand or frame upon a vertical shaft, so that the saw to be sharpened shall occupy such a position beneath the emery wheel as to bring the beveled edge of the latter, when in operation, against the front and its outer face against the top of the teeth at any desired angle. The invention consists, fourthly, in adapting the saw-stand to be swung around or with its shaft, so as to carry the saw to either side of the plane of the emery-wheel arbor, for the purpose of sharpening both the front and top of the saw-teeth at any desired bevel. The invention consists, fifthly, in adapting for adjustment the bottom of the shaft which carries the saw-stand, for the purpose of throwing the face of the saw out of a vertical line, so that the emery wheel shall impart any desired bevel to the front of the saw-teeth irrespective of the plane or bevel given to the top. The invention consists, sixthly, in constructing the saw-stand to receive saws of different sizes, and in the adjustment of the same to compensate for the wear of the emery wheel. The invention consists, finally, in the construction and combination of various parts of the machine, as I will now proceed to describe.

In the accompanying drawing, A is the frame of the machine, constructed in the form shown or in any other suitable form, and carrying at its rear end the driving-shaft and pulley B. The front of the frame extends somewhat above the main portion, and is provided with two parallel horizontal ways or guides, C, one near the top and the other about midway of said front. D is a sash or frame, adapted to slide laterally upon the ways C, and upon the vertical side rods of this sash is mounted another sash, E, carrying the horizontal arbor F of the emery wheel. The arbor has its bearings in the end pieces of the sash E, about midway of the side bars thereof, and carries a pulley, around which passes a belt, G, from the main driving-pulley B. This arrangement of the arbor permits the driving-belt to pass freely between the side bars of the sash E without coming in contact therewith as the latter is moved up and down upon the vertical side rods of the sash D. The sash E is moved up and down upon the sash D by means of a weighted lever or treadle, I, pivoted to the front sill of the frame, and connected to the sash E by a pivoted rod, J, as shown. K is a stop, adapted for vertical adjustment upon the central cross-piece L of the frame, to arrest and regulate the downward movement of the sash E. The frame or stand carrying the saw to be sharpened is constructed in the following manner: M is the vertical shaft of the stand, having its bearings in brackets attached to the front sill and cross-piece L of the frame. N is a slotted vertical bar, attached, by lateral arms O, to the shaft M; and P P are two lateral bars, hinged together at an angle and secured at their inner ends, by set-screws $q$, to the upper and lower ends of the vertical bar N, so as to be adjusted in the slots of the same. R is a clasp of metal, embracing the upper bar P, and provided upon its outer face with a short stud, $s$, upon which the saw to be sharpened is mounted, as shown at T. The stud $s$ is made tubular to receive a set-screw, $u$, whose inner end bears against the bar, and by which the clasp and saw are adjusted to the required position upon said bar. By adjusting the bars P upon the bar M the stand is adapted to receive saws of different sizes, and to adjust the same nearer to or further from the emery wheel. Secured at right angles to the end of the upper bar P is a short bar, V, which supports the side of the saw near the teeth, to prevent it from vibrating or twisting during the operation of sharpening. The inner end of the lower bar P is slotted to receive the set-screw $q$, by the adjustment of which the bar is moved out or in, causing the upper bar to turn on its set-screw as a pivot, for the purpose of varying the angle of the saw-teeth with respect to the grinding-surfaces of the emery wheel W. This wheel is constructed with a recess in its widest face to receive the loose flange $x$, by which such wheel is secured to the end of its arbor F. By this construction and method of attachment the wheel is adapted to be mounted upon the arbor with its smaller face next the sash E, so that its beveled edge shall operate against the front of the saw-teeth and its outer wide face against the top thereof, thereby giving the point of each tooth a concave front and straight top. The flange, being let into the recess, cannot come in contact with the teeth to injure them when the wheel is worn down small.

By the usual method of attachment in machines of this class the loose flange projects from the wide face of the wheel, and such face cannot be employed to grind the long edge or top of the saw-teeth because the points of the latter would come in contact with the flange, particularly when the wheel decreases in diameter by wear. For this reason the wide face is placed next the shaft, so that it shall grind the short edge or front of the teeth, while the beveled face grinds the long edge or top.

Y is the upper, and Z the lower, bracket which form the bearings for the vertical shaft M of the saw-stand. The outer end of the upper bracket is slotted for the passage of the shaft, and provided with two side ears, $a'$, in which is swiveled a ring, $b'$, which embraces and holds the end of the shaft.

The lower bracket Z is composed of two parts, one part, $c'$, being formed with parallel side flanges and secured to the front sill of the frame, and the other part, $d'$, being provided with a swiveled ring, $e'$, and adapted to slide between the flanges of the part $c'$. The two parts are secured together at any desired point by a spring, $f$, affixed to the sliding plate and provided with a small point at its free end which projects through a series of holes, $g'$, formed through both parts, as shown in Fig. 3. The shaft M fits loosely within the swiveled rings $b'$ and $e'$ and is supported therein by a collar, $h'$, surrounding it above the lower ring, as shown in Fig. 1. By this arrangement the shaft is permitted a vertical movement to adapt the saw to emery wheels of different diameters, and is operated in the following manner: I' is a long lever or treadle extending from the front to the rear of the frame where it is pivoted to the sill. J' is a short lever pivoted at one end to the rear side of the shaft M, and at or near its center to a pivoted hanger, K', depending from the front cross-piece L. The inner end of this lever is pivoted to the lever I' near the center of the latter by a short connecting-bar, L', as shown in Fig. 2.

The operation of the machine thus far described is as follows: The saw being adjusted upon the stand to the requisite position is moved upward toward the emery wheel by depressing the outer end of the treadle I', where it is held by catching the treadle under a stop or stirrup, $m'$, depending from the cross-piece L. The emery wheel is then moved down in contact with the saw-teeth by depressing the treadle I, and both treadles are guided in their movements by the frame N² near the center of the machine. The saw is turned upon its stud by hand to receive the action of the emery wheel.

N¹ is a sash-guide composed of three links, pivoted together and attached by set-screws $o'$ to the front of the machine upon the right of the sashes D E. The central link occupies a vertical position and receives a lateral projection upon the upper side bar of the sash E, as shown in Fig. 1. By adjusting the guide so that the central link shall be more or less inclined, the two sashes are caused to carry the emery wheel diagonally against the teeth of the saw with a drawing or raking action, thereby producing smooth instead of rough cutting edges. When the wheel is withdrawn or moved up it recedes from the adjoining teeth at the same instant without injuring the edge of either. By adjusting the guide laterally the wheel is moved nearer to or further from a vertical line drawn through the center of the saw for the purpose of changing or regulating the angle given the top of the teeth in sharpening. Any desired bevel is given to the front and top of the saw-teeth by swinging the saw-stand either to the front or rear of a line extending vertically through the center of the emery wheel, the stand being locked in the required position by a rod, P', one end of which is attached to the rear side of the stand and the opposite end adapted to enter a series of holes formed in a plate, q', affixed to one of the side pieces of the frame, as shown by dotted lines, Fig. 1. When it is desired to impart a certain bevel to the front of the saw-teeth irrespective of the plane or bevel given to the top, the lower end of the stand-shaft M is moved out or in upon its bracket, so as to throw the face of the saw out of a vertical line. In this position the beveled edge of the emery wheel acts upon the front of the teeth, while the top of the teeth remain untouched. The amount of bevel is determined by the graduations upon the sliding plate d' of the bracket and the index-finger secured to the fixed plate c' thereof, as will be readily understood.

My improved saw-stand is not only adapted to present the saw to the emery wheel when the latter is hung in a sliding frame, but also when the arbor runs in fixed bearings, so that by arranging it in an overhanging position and employing the vertically-moving stand in connection with it I produce a complete saw-gummer as well as a good sharpener.

Having thus described my invention, what I claim is—

1. The emery wheel in combination with the sliding sashes D E, substantially as described, for the purposes specified.

2. The combination of an adjustable guide with the sliding sashes to regulate the angle at which the emery wheel shall approach and recede from the saw-teeth, substantially as described, for the purposes specified.

3. In combination with the emery wheel, adapted to slide by means of the sashes D and E, I claim the adjustable saw-stand, substantially as described, for the purposes specified.

4. The adjustable saw-stand constructed, as described, to hold the face of the saw at an inclination, so that the sliding emery wheel shall bevel the front of the teeth at an angle irrespective of the bevel or plane given the top of the teeth.

5. The combination of the horizontally-sliding sash D and the vertically-sliding sash E carrying the emery wheel W, substantially as described, for the purposes specified.

6. In combination with the sliding sashes D E, I claim the adjustable guide N', substantially as described, for the purposes specified.

7. In combination with the sliding sash E carrying the emery wheel, I claim the adjustable stop K, substantially as described, for the purposes specified.

8. The weighted treadle I, the connecting-rod J, and adjustable guide N', in combination with the sashes D E, substantially as described, for the purposes specified.

9. The saw-stand, consisting of the vertical shaft M, slotted upright N, and the adjustable hinged arms P, substantially as described, for the purposes specified.

10. The saw-stand having its shaft M adapted to turn in its bearings to permit the swinging of the saw either to the front or rear of the emery-wheel shaft, substantially as described, for the purposes specified.

11. In combination with the adjustable upper arm P and the slotted upright N of the saw-stand, I claim the supporting cross-bar V, arranged substantially as described, for the purposes specified.

12. The adjustable lower arm P of the saw-stand in combination with the upper arm and the slotted upright N, for the purpose of varying the angle of the saw-teeth with respect to the grinding-surface of the emery wheel, substantially as herein described.

13. The adjustable clasp R upon an arm of the saw-stand, constructed with the tubular stud s to receive the saw and the adjusting-screw u, substantially as described.

14. The vertical shaft M of the saw-stand, mounted in the brackets Y Z by means of the swiveled rings or collars b e', substantially as described, for the purposes specified.

15. The adjustable bracket Z, consisting of the fixed guide-plate c' and graduated sliding plate d', substantially as described, for the purpose specified.

16. In combination with the fixed and sliding plates of the bracket Z, I claim the spring-catch f', substantially as described, for the purposes specified.

17. The combination of the swiveled rings b' e' and the collar h' with the adjustable shaft M of the saw-stand, for the purpose of applying the saw to emery wheels of different diameters, substantially as described.

18. In combination with the saw-stand, I claim the treadle I' and its connecting devices, substantially as described, for the purposes specified.

19. The stirrup or stop m', in combination with the treadle I', to hold the saw-frame elevated, substantially as described, for the purposes specified.

20. The solid beveled emery wheel W, constructed with the recess in its wide flat face, to receive the loose flange x, and arranged upon the arbor F, as herein described, for the purposes specified.

DENNIS BACKUS.

Witnesses:
W. W. RACE,
JAS. PARIS.